(12) United States Patent
Bullard

(10) Patent No.: US 10,677,651 B1
(45) Date of Patent: Jun. 9, 2020

(54) IMMERSED REFLECTIVE TRIPLET IMAGING SPECTROMETER

(71) Applicant: RAYTHEON COMPANY, Waltham, MA (US)

(72) Inventor: Andrew Bullard, Manhattan Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/426,793

(22) Filed: May 30, 2019

(51) Int. Cl.
| | |
|---|---|
| *G01J 3/28* | (2006.01) |
| *G01J 3/02* | (2006.01) |
| *G02B 17/08* | (2006.01) |
| *G02B 27/42* | (2006.01) |
| *G01J 3/18* | (2006.01) |

(52) U.S. Cl.
CPC ............... *G01J 3/021* (2013.01); *G01J 3/024* (2013.01); *G01J 3/0291* (2013.01); *G01J 3/18* (2013.01); *G01J 3/2803* (2013.01); *G01J 3/2823* (2013.01); *G02B 17/086* (2013.01); *G02B 17/0832* (2013.01); *G02B 27/4244* (2013.01)

(58) Field of Classification Search
CPC ........ G01J 3/021; G01J 3/2823; G01J 3/2803; G01J 3/0291; G01J 3/18; G01J 3/024; G01J 3/28; G01J 3/02; G01J 3/26; G02B 27/4244; G02B 17/0832; G02B 17/086
See application file for complete search history.

(56) References Cited

U.S. PATENT DOCUMENTS

| | | | |
|---|---|---|---|
| 5,260,767 A | 11/1993 | Cook | |
| 5,880,834 A | 3/1999 | Chrisp | |
| 7,697,137 B2 | 4/2010 | Comstock, II | |
| 2003/0206338 A1* | 11/2003 | Cook | G02B 17/0804 359/356 |

\* cited by examiner

*Primary Examiner* — Abdullahi Nur
(74) *Attorney, Agent, or Firm* — Lando & Anastasi, LLP

(57) ABSTRACT

According to certain examples a spectrometer module for use in an imaging spectrometer includes a monolithic spectrometer body component made of an immersion material and including three mirrored surfaces configured to form a reflective triplet having an optical path immersed within the immersion material, the reflective triplet configured to receive incident optical radiation from an entrance face of the monolithic spectrometer body component and reflect the incident optical radiation along the optical path, and a dispersive element configured to receive and disperse the incident optical radiation reflected from the reflective triplet to provide dispersed optical radiation. The reflective triplet is configured to receive the dispersed optical radiation from the dispersive element and to reflect the dispersed optical radiation along the optical path to an exit face of the monolithic spectrometer body component.

21 Claims, 7 Drawing Sheets

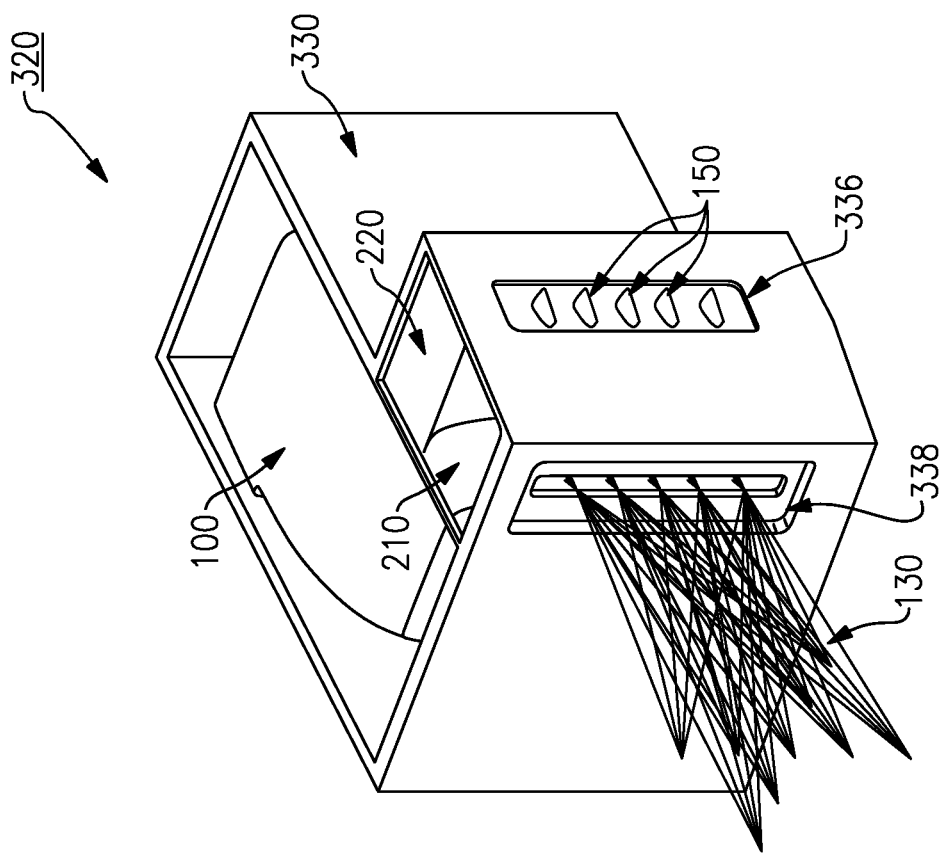
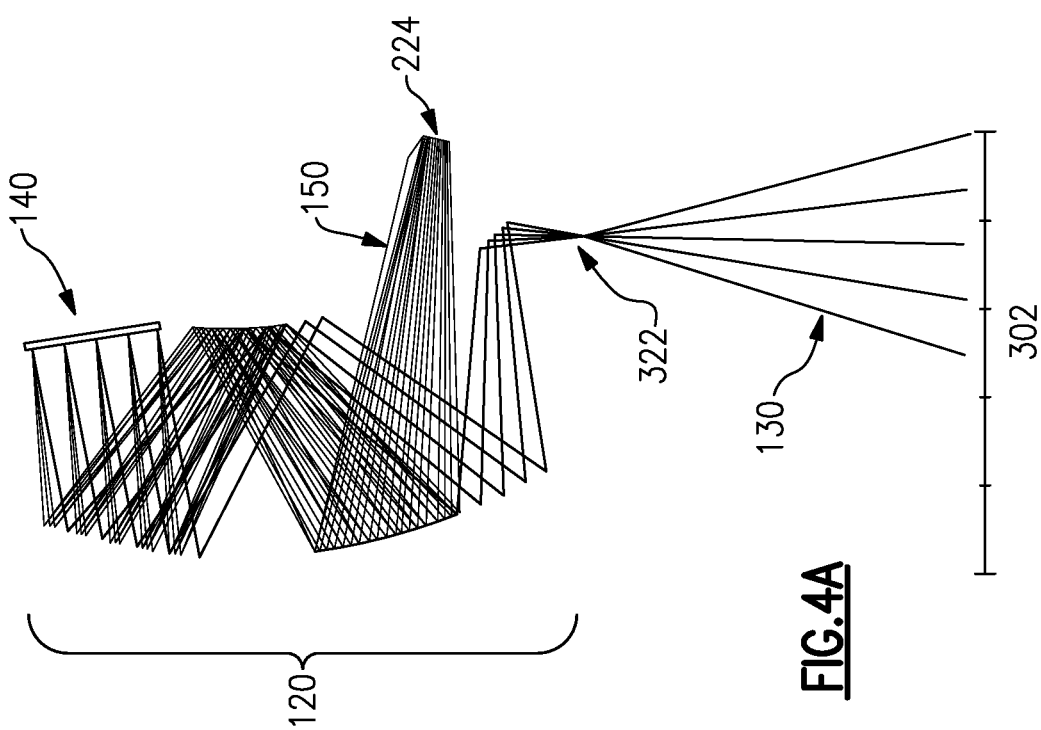

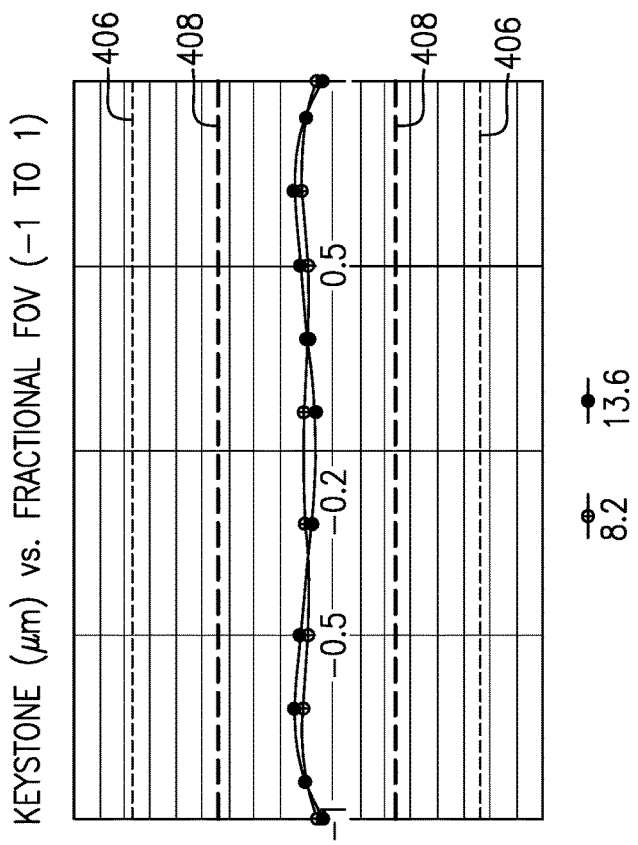
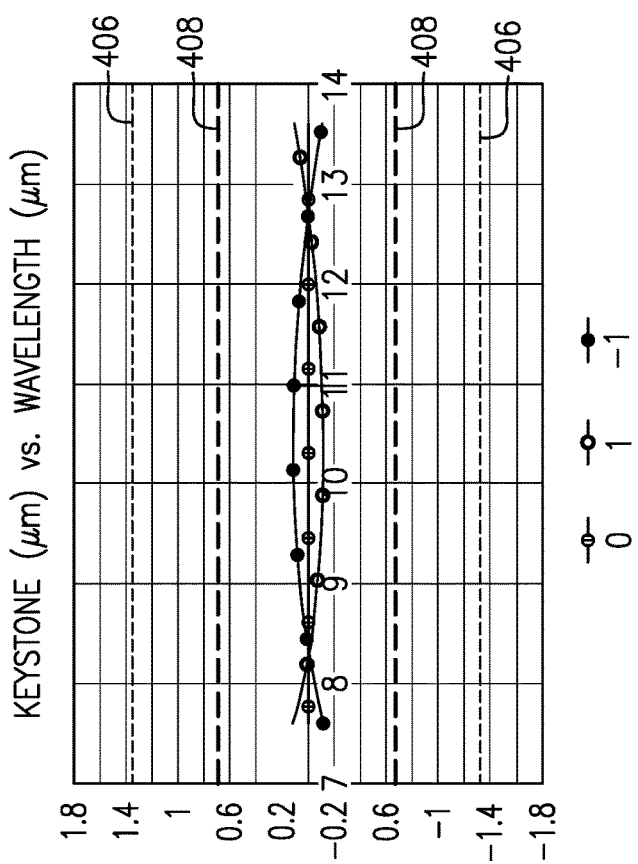
FIG.6A
FIG.6B

IMMERSED REFLECTIVE TRIPLET IMAGING SPECTROMETER

BACKGROUND

Imaging spectrometers are used for a wide variety of strategic, scientific and resource sensing applications. Typically, an imaging spectrometer system includes an objective (also called an imaging optical module) that forms a scene image at a slit and a spectral optical module, which receives and collimates the line field of view from the objective, disperses or separates the radiation as a function of wavelength, and images it onto a two-dimensional detector array. One dimension of the array contains spatial information, while the other contains spectral information. The spectral optical module usually takes the form of an image relay between the slit and a focal plane (where the detector array can be located) with a dispersing element, most commonly a prism or a diffraction grating, located at a pupil between the images.

Common imaging spectrometers include the Offner-Chrisp and Dyson optical forms. Reflective triplet imaging spectrometers are also used, particularly where it is desired to cover a very wide field of view (FOV). Examples of a reflective triplet imaging spectrometer are described in U.S. Pat. No. 5,260,767. It is generally desired that the size of the spectrometer, and the power needed to cool the spectrometer, especially for infrared applications, is minimized. This is especially true when the instrument is used on mobile platforms, such as aircraft or spacecraft. The size of the spectrometer is traditionally driven by the optical f/# (a faster instrument generally requires larger optics) and the field of view (a larger FOV also generally requires larger optics). The Dyson optical form is generally much smaller than the Offner-Chrisp optical form when fast (low) f/# s are required, but uses refractive optics (lenses) and therefore suffers from the limitations and disadvantages associated with those refractive optics, including chromatic aberration, limited spectral bandwidth, defocus with temperature change requiring compensation, potential high narcissus, and high cost associated with the complexity and expensive refractive materials. All-reflective optical designs, such as the Offner-Chrisp and reflective triplet, avoid these problems, but may not be able to achieve f/# s faster than about f/2, and are also generally larger than refractive optics.

The Offner-Chrisp imaging spectrometer is widely used, but has limited FOV with acceptable wavefront error and distortion for many imaging applications, and also cannot typically achieve optical speed faster than f/2. As an all-reflective design, it has wide spectral bandwidth, but much larger size than a reflective triplet design with the same f/#, FOV, and distortion. In addition, conventional Offner-Chrisp imaging spectrometers require a convex diffraction grating with tight spacing, and telecentric incident light, which necessitates cryo-cooled imaging optics (objective) for thermal infrared (e.g., in the long-wave infrared spectral band) systems. A monolithic Offner-Chrisp imaging spectrometer has been developed, as described in U.S. Pat. No. 7,697,137, which may achieve smaller size and faster f/# s than conventional Offner-Chrisp imaging spectrometers. Dyson imaging spectrometers are also commonly used, particularly where it is desired to achieve faster f/# s. The Dyson optical form is compact for a given f/#, FOV, and performance, but suffers from the limitation and disadvantages associated with refractive optics, as discussed above. In addition, Dyson imaging spectrometers require telecentric incident light, and therefore cryo-cooled imaging optics for thermal imaging applications, along with a concave diffraction grating.

SUMMARY OF INVENTION

Aspects and embodiments are directed to a monolithic, also referred to as "immersed," reflective triplet imaging spectrometer and systems and methods using the same. Embodiments of the spectrometer disclosed herein may achieve equivalent f/# and FOV to some conventional spectrometers, while being significantly smaller in size and mass and therefore requiring less power to cool. As discussed in more detail below, aspects and embodiments are directed to an imaging spectrometer that is much smaller and lighter, may achieve faster f/# s, and provides a larger FOV than conventional imaging spectrometer options providing the same or similar performance metrics (e.g., wavefront error, distortion, spectral coverage, etc.).

According to one embodiment, a spectrometer module comprises a monolithic spectrometer body component made of an immersion material and including three mirrored surfaces configured to form a reflective triplet having an optical path immersed within the immersion material, the reflective triplet configured to receive incident optical radiation from an entrance face of the monolithic spectrometer body component and reflect the incident optical radiation along the optical path, and a dispersive element configured to receive and disperse the incident optical radiation reflected from the reflective triplet to provide dispersed optical radiation, wherein the reflective triplet is further configured to receive the dispersed optical radiation from the dispersive element and to reflect the dispersed optical radiation along the optical path to an exit face of the monolithic spectrometer body component, and wherein the optical path is immersed within the immersion material between the entrance face of the monolithic spectrometer body component and the dispersive element and between the dispersive element and the exit face of the monolithic spectrometer body component.

In one example the immersion material is zinc selenide.

In one example the dispersive element is a diffraction grating that includes a series of grooves cut into a surface of the monolithic spectrometer body component and a reflective coating disposed on the surface of the monolithic spectrometer body component over the series of grooves.

The spectrometer module may further comprise an entrance prism configured to direct the incident optical radiation to the entrance face of the monolithic spectrometer body component. In one example the spectrometer module further comprises an exit prism configured to receive the dispersed optical radiation from the exit face of the monolithic spectrometer body component and focus the dispersed optical radiation onto an image plane. In one example the entrance prism and the exit prism are made of the immersion material. In another example the spectrometer module further comprises an imaging detector array located at the image plane and configured to receive and image the dispersed optical radiation. In one example the imaging detector array is tilted relative to the exit face of the monolithic spectrometer body component to provide chromatic correction.

In other example the spectrometer module further comprises an entrance-exit prism configured to direct the incident optical radiation to the entrance face of the monolithic spectrometer body component and to receive the dispersed optical radiation from the exit face of the monolithic spectrometer body component and focus the dispersed optical radiation onto an image plane, the entrance-exit prism being made of the immersion material.

The spectrometer module may further comprise an entrance slit. In one example the entrance slit is formed as a coating on the entrance face of the monolithic spectrometer body component. In another example the spectrometer module comprises a metal plate having the entrance slit disposed in a surface thereof and arranged to direct the incident optical radiation to the entrance face of the monolithic spectrometer body component.

According to another embodiment, an imaging spectrometer comprises an objective module configured to receive incident optical radiation from object space and to focus the incident optical radiation onto an image plane, a spectral optical module configured to receive the incident optical radiation from the objective module via an entrance slit, the spectral optical module including a dispersive element configured to disperse the incident optical radiation to formed dispersed optical radiation, and a monolithic spectrometer body component, the monolithic spectrometer body component being made of an immersion material and including three mirrored surfaces configured to form a reflective triplet having an optical path immersed within the immersion material, the reflective triplet configured to receive the incident optical radiation from an entrance face of the monolithic spectrometer body component, to reflect the incident optical radiation along the optical path to the dispersive element, and to reflect the dispersed optical radiation along the optical path and focus the dispersed optical radiation through an exit face of the monolithic spectrometer body component onto a focal plane, and an imaging detector array located at the focal plane.

In one example the entrance slit is formed as a coating on the entrance face of the monolithic spectrometer body component. In another example the spectral optical module includes a metal plate, the entrance slit being formed in the metal plate.

In one example the spectral optical module further includes an entrance prism located between the image plane and the entrance face of the monolithic spectrometer body component and configured to direct the incident optical radiation from the image plane to the reflective triplet via the entrance face of the monolithic spectrometer body component, and an exit prism located between the exit face of the monolithic spectrometer body component and the focal plane and configured to direct the dispersed optical radiation from the exit face of the monolithic spectrometer body component to the focal plane. In one example the entrance prism and the exit prism are made of the immersion material.

In one example the immersion material is zinc selenide.

In another example the spectral optical module further includes an entrance-exit prism located proximate the monolithic spectrometer body component and configured to direct the incident optical radiation from the image plane to the reflective triplet via the entrance face of the monolithic spectrometer body component, and to direct the dispersed optical radiation from the exit face of the monolithic spectrometer body component to the focal plane.

In one example the dispersive element is a diffraction grating that includes a series of grooves cut into a surface of the monolithic spectrometer body component and a reflective coating disposed on the surface of the monolithic spectrometer body component over the series of grooves.

In another example the imaging detector array is tilted relative to the exit face of the monolithic spectrometer body component to provide chromatic correction.

In another example the objective module includes an all-reflective three mirror anastigmat.

In one example the incident optical radiation is infrared radiation in a wavelength range of 8-12 micrometers.

In another example the imaging spectrometer further comprising a housing, the spectral optical module and the imaging detector array being disposed within the housing, the housing including a window region that is optically transparent to the incident optical radiation.

According to another embodiment, a method of making a spectrometer module comprises forming a monolithic spectrometer body component of an immersion material, polishing a surface of the monolithic spectrometer body component to form an optically finished, flat entrance face on the surface of the monolithic spectrometer body component, forming a diffraction grating on a region the monolithic spectrometer body component, and forming three mirrored surfaces within the monolithic spectrometer body component to provide a reflective triplet having an optical path immersed within the immersion material, the optical path extending between the entrance face and the diffraction grating.

In one example of the method, polishing the surface of the monolithic spectrometer body component further includes forming an optically finished, flat exit face proximate the entrance face, the optical path further extending between the diffraction grating and the exit face.

In another example of the method, forming the diffraction grating includes cutting a series of grooves into a surface of the region of the monolithic spectrometer body component, and forming a reflective coating, such as a silvered coating, on the surface of the region of the monolithic spectrometer body component over the series of grooves.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 4A is a ray trace of one example of the optical path of an example of the spectral optical module of an example of the imaging spectrometer of FIG. 3, according to aspects of the present invention;

FIG. 4B is a diagram one of example of a packaged spectral optical module of the imaging spectrometer of FIG. 3, according to aspects of the present invention;

FIG. 6A is a graph of keystone error as a function of wavelength for the example of the imaging spectrometer according to aspects of the present invention; and FIG. 6B is a graph of smile as a function of fractional field of view for the example of the imaging spectrometer according to aspects of the present invention.

DETAILED DESCRIPTION

Aspects and embodiments are directed to a compact imaging spectrometer that includes a monolithic main body with multiple optical surfaces forming a reflective triplet with an optical path immersed inside the monolith material.

The reflective triplet optical form provides numerous benefits when used in an imaging spectrometer, including excellent spatial and spectral performance. The reflective triplet optics are compatible with numerous dispersive elements to provide moderate spectral resolution over a broad wavelength band or to provide high spectral resolution over a more narrow band, for example, as well as with a variety of objective optical forms. According to certain embodiments, the reflective triplet optics are used in a double pass technique which utilizes the same system to both collimate and image the radiation beam and facilitates maintaining small size of the system. Also, the all-reflective nature of the optical system enables general applications from visible wavelength out to the extended long-wave infrared (LWIR; e.g., wavelengths in a range of about 8 micrometers (µm) to 12 µm or even 15 µm). In addition, the spectrometer may be utilized with a wide field of view.

According to certain embodiments, an imaging spectrometer includes a reflective triplet in the spectral optical module, wherein almost the entire optical path between the slit and the final image plane is immersed in a high-refractive index material that transmits the desired spectral band. This immersion allows the module to be shrunk dramatically in size because it effectively increases the f/# of the optical design by a factor equal to the refractive index of the immersion material. For example, if Zinc Selenide (ZnSe) is used as the immersion material, ZnSe has a refractive index of 2.4, and therefore a spectrometer f/# of f/2 becomes f/4.8. This reduction in optical speed may greatly improve the performance of the optical design, thus allowing shrinking of the size of the optics. This shrinking effectively increases the FOV at the pupil inside the relay where the dispersing element is located. However, due to the slower f/#, the design can readily accommodate a very large increase in FOV and still adequately correct both the wavefront error and the distortion that cause keystone and smile, which are key performance metrics of an imaging spectrometer (in addition to f/# and FOV).

Figure 1:
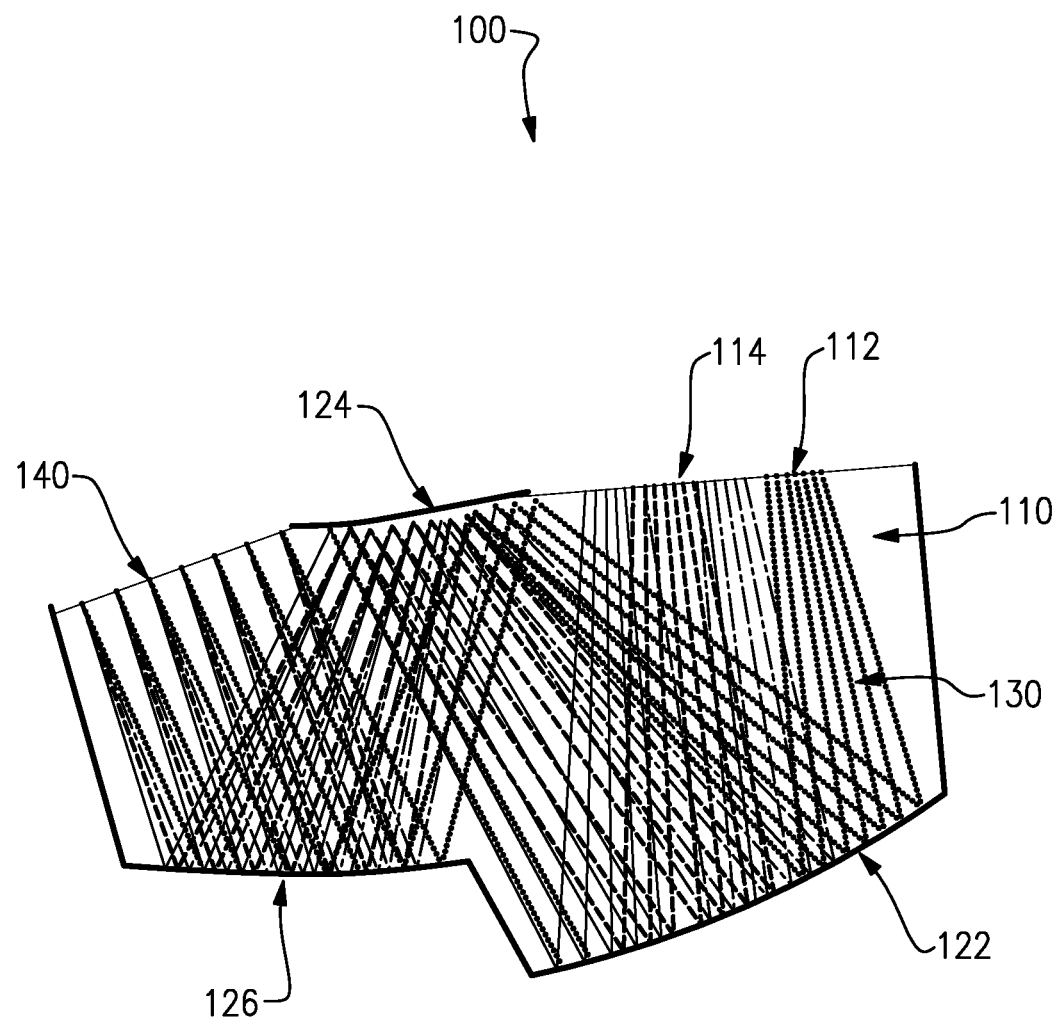
FIG. 1 is a partial ray trace of one example of a monolithic reflective triplet for use in an imaging spectrometer according to aspects of the present invention.

Referring to FIG. 1, there is illustrated a partial ray trace of one example of a portion of a spectral optical module of an imaging spectrometer including an image relay configured as a reflective triplet. The spectral optical module includes a monolithic spectrometer body component 100, with the mirrors of the reflective triplet, forming the image relay, immersed in an immersion material 110. As discussed above, the immersion material may be a high-refractive index material that transmits optical radiation in the desired spectral band(s). For example, the infrared imaging applications, the immersion material 110 may be ZnSe. Other examples of materials that can be used for the immersion material 110 include, but are not limited to, Silicon, Germanium, and fused Quartz. The reflective triplet includes a primary mirror 122, a secondary mirror 124, and a tertiary mirror 126. The mirrors 122, 124, 126 may be formed as reflective coatings on the immersion material 110. In one example, the mirrors 122, 124, and 126 are formed as silvered coatings on regions of the immersion material 110.

The monolithic spectrometer body component 100 includes an entrance face 112 where incident optical radiation 130 from the objective is received. In one example, the entrance face 112 is a flat, optically finished (e.g., polished) surface of the immersion material 110, that optionally may be coated with an anti-reflective coating. The incident optical radiation 130 is received at the entrance face 112 and directed through the immersion material 110 to the primary mirror 122. The optical radiation 130 is reflected from the primary mirror 122 through the immersion material 110 to the secondary mirror 124, and reflected from the secondary mirror 124 through the immersion material 110 to the tertiary mirror 126. In one example each of the primary mirror 122, the secondary mirror 124, and the tertiary mirror 126 are "aspheres" (i.e., their reflecting surfaces have aspheric shapes or figures). The optical radiation 130 is further reflected from the tertiary mirror 126, collimated, and directed to a dispersive element 140 that disperses the optical radiation 130 into its spectral components to provide dispersed optical radiation as shown in FIG. 1.

In one example the dispersive element 140 is a diffraction grating. The dispersive element 140 may be integrally formed with the monolithic spectrometer body component 100. For example, the dispersive element 140 may be a single-blaze diffraction grating that can be formed as a series of grooves cut into a surface of the immersion material 110, with a silvered coating, or other reflective coating, disposed over the grating region of the immersion material 110 to form a reflective grating. In other examples, the grating may be cut into the surface of the immersion material 110 and a flat mirror may be placed adjacent to the grating region of the surface of the monolithic spectrometer body component 100 that to reflect the optical radiation back through the immersion material to the tertiary mirror 126 of the immersed reflective triplet. Alternatively, the dispersive element 140 may be external and adjacent to the monolithic spectrometer body component. The dispersed optical radiation is reflected from the dispersive element 140 and directed back through the immersion material 110 via reflections from the three mirrors 122, 124, and 126 of the reflective triplet and provided at an exit face 114 of the monolithic spectrometer body component 100. Thus, the image relay formed by the immersed reflective triplet operates in a "double pass" configuration, guiding the incident optical radiation 130 to the dispersive element 140 and the dispersed optical radiation from the dispersive element to the exit face 114. In certain examples in which the dispersive element 140 is a blazed diffraction grating, the grating can be formed in the Littrow configuration, meaning that it has a geometry in which the blaze angle is chosen such that the dispersed optical radiation is back-reflected in the direction of the incident optical radiation 130 and the image relay operates in the double-pass configuration, as discussed above.

In one example the exit face 114 is a flat, optically finished (e.g., polished) surface of the immersion material 110, and may be co-located with the entrance face 112, as shown in FIG. 1. In one example, after the coatings forming the mirrors 122, 124, and 126 and the dispersive element 140 are formed on the appropriate regions of immersion material 110, the monolithic spectrometer body component 100 may be painted black or otherwise configured, other than at the entrance face 112 and exit face 114, to prevent unwanted stray optical radiation from entering the monolithic spectrometer body component 100.

According to certain embodiments the spectral optical module may include an entrance component arranged and configured to direct the incident optical radiation 130 from the objective to the entrance face 112 of the monolithic spectrometer body component 100, and an exit component arranged and configured to receive the dispersed optical radiation from the exit face 114 of the monolithic spectrometer body component 100 and to focus the dispersed optical radiation onto a focal plane where an imaging detector may be located. In one example, the entrance component and the exit component are prisms.

Figure 2:
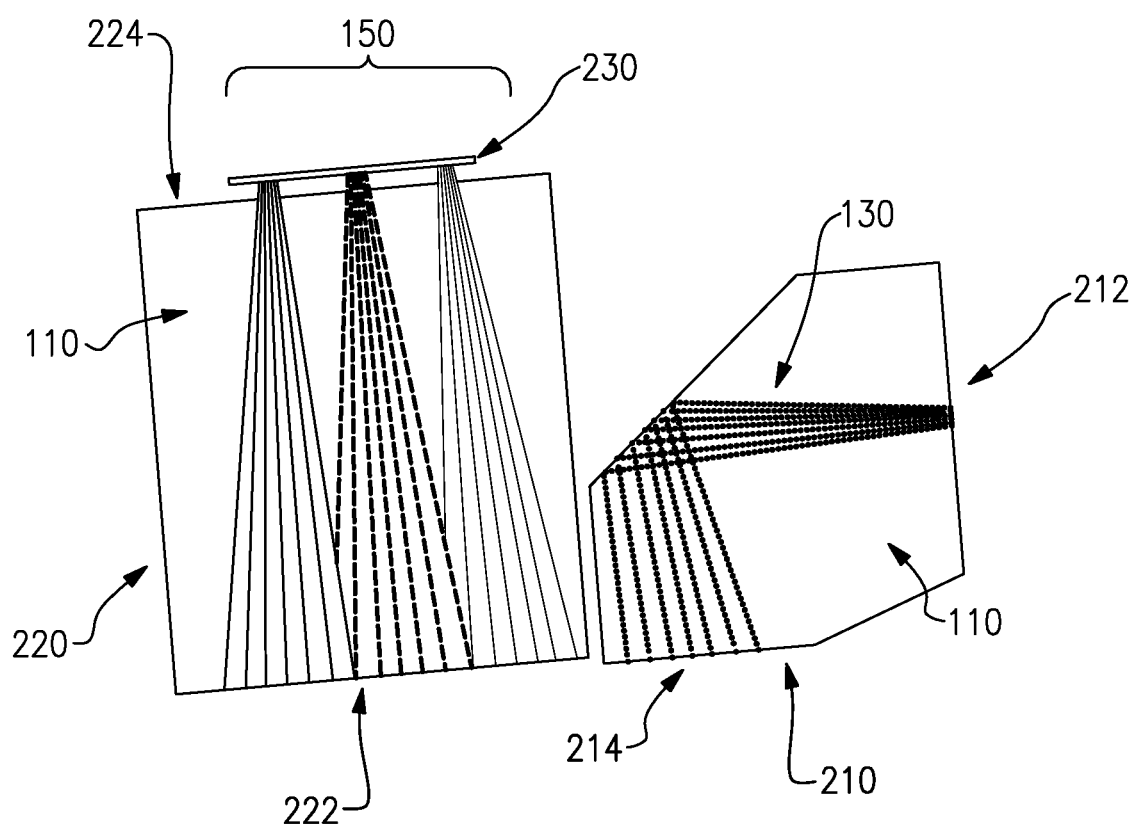
FIG. 2 is a partial ray trace of an example of components on a spectral optical module for an imaging spectrometer according to aspects of the present invention.

FIG. 2 illustrates an example of an entrance prism 210 and an exit prism 220. In certain examples, the entrance prism 210 and the exit prism 220 can be located side-by-side, as shown in FIG. 2, and may also be co-located with the entrance face 112 and the exit face 114, respectively, of the monolithic spectrometer body component 100, as shown in FIG. 1 for example. Although the entrance prism 210 and the exit prism 220 are shown as separate components in FIG. 2, in other examples the two may be formed as a single entrance-exit prism having entrance and exit faces as shown and discussed below. The incident optical radiation 130 may be received at an entrance face 212 of the entrance prism 210 and directed to an exit face 214 of the entrance prism 210, from where it may be coupled into the monolithic spectrometer body component 100 via the entrance face 112 of the monolithic spectrometer body component 100. Similarly, the dispersed optical radiation 150 may be received at an entrance face 222 of the exit prism 220 from the exit face 114 of the monolithic spectrometer body component 100, and focused onto a focal plane 230. An imaging detector array may be located at the focal plane 230, which may be co-located with or adjacent to an exit face 224 of the exit prism 220, as shown in FIG. 2. In certain examples the entrance prism 210 and the exit prism 220 may be made of the immersion material 110. In one example, the entrance face 212 and exit face 214 of the entrance prism 210 may be coated with an anti-reflective coating, and remaining surfaces of the entrance prism 210 may be painted black or otherwise configured to minimize stray light from entering or escaping from the entrance prism 210. Similarly, the entrance face 222 and the exit face 224 of the exit prism 220 may be coated with an anti-reflective coating, and remaining surfaces of the exit prism 220 may be painted black or otherwise configured to minimize stray light from entering or escaping from the exit prism 220. The use of separate entrance and exit prisms 210, 220 with air gaps at the input and output to the monolithic spectrometer body component 100 may facilitate ease of manufacturing and manage stray light diffracted at the spectrometer slit.

As used herein, the term optical radiation refers to non-ionizing electromagnetic radiation in any one or more of the optical spectral bands, including visible light (e.g., having wavelengths in a range of approximately 390 nanometers (nm) to 700 nm), ultraviolet light, and infrared radiation (e.g., having wavelengths in a range of approximately 700 nm to 1 millimeter), that can be acted upon (e.g., reflected, refracted, and/or spectrally dispersed into constituent wavelengths) by optical components, such as mirrors, lenses, prisms, and/or gratings.

Figure 3:
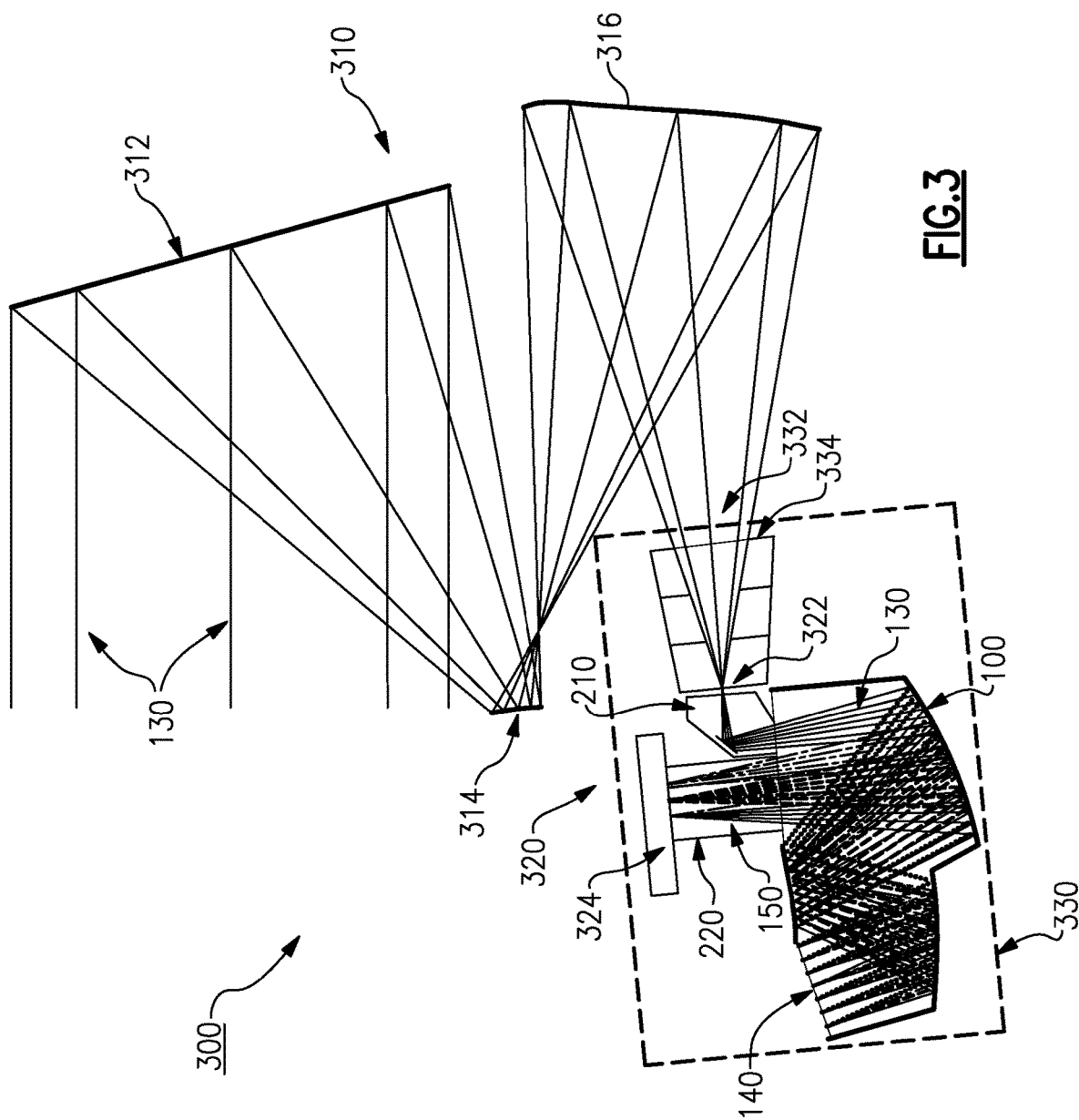
FIG. 3 is a diagram and partial ray trace of one example of an imaging spectrometer according to aspects of the present invention.

Referring to FIG. 3 there is illustrated an example of an imaging spectrometer 300 configured for thermal infrared imaging applications. Thus, the incident optical radiation 130 may be in the thermal infrared, also referred to as the long-wave infrared (LWIR) spectral band, including wavelengths in the range of approximately 8 micrometers (µm) to 12 µm. The imaging spectrometer 300 includes an objective 310 and a spectral optical module 320. As discussed above, the objective 310 receives the incident optical radiation 130 from object space and directs it to entrance face 212 of the entrance prism 210. In the illustrated example, the objective 310 is configured as an all-reflective three-mirror anastigmat having a primary objective mirror 312, a secondary objective mirror 314, and a tertiary objective mirror 316. In this example, the incident optical radiation 130 is received from object space at the primary objective mirror 312, reflected from the primary objective mirror 312 to the secondary objective mirror 314, reflected from the secondary objective mirror 314 to the tertiary objective mirror 316, and reflected from the tertiary objective mirror 316 toward the spectral optical module 320. However, in other examples the objective 310 may have a different optical form. The objective 310 may include any one or more reflective optical component(s) (e.g., mirrors) and/or refractive optical component(s) (e.g., lenses), or may be eliminated entirely in certain examples.

The incident optical radiation 130 is received at the spectral optical module 320. For thermal infrared imaging applications, the spectral optical module 320 (or at least certain components thereof) may be housed in a cold shielded enclosure or housing 330, such as an evacuator Dewar, for example. The housing 330 includes a window region 332 wherein the incident optical radiation 130 is received and that is optically transparent to the incident optical radiation 130. In certain examples, the housing 330 includes a cold pupil mask 334 that is co-located with, or located proximate to, the window region 332. The mask 334 may have any shape. The incident optical radiation 130 is received via the cold pupil mask 334 and directed to an image plane 322 where it is coupled into the entrance prism 210. In certain examples the spectrometer slit may be located at or near the image plane 322. In one example the spectrometer slit is formed as a coating or mask on the entrance face 212 of the entrance prism 210. In other examples, the spectrometer slit can be formed as a coating or mask on the entrance face 112 of the monolithic spectrometer body component 100. In other examples, the entrance slit can be formed in a metal plate or sheet, the slit being precision cut through the metal plate or sheet. As used herein the terms "plate and sheet" are synonymous. The incident optical radiation 130 is directed from the entrance slit through the immersed reflective triplet to the dispersive element 140 where it is dispersed into its spectral components to provide the dispersed optical radiation 150, as discussed above. The dispersed optical radiation 150 returns via the immersed reflective triplet and the exit prism 220 to be focused onto an imaging detector array 324 located at the focal plane 230. In certain examples the imaging detector array 324 (which may be a focal plane array) may be tilted with respect to the exit face 224 of the exit prism 220 to provide chromatic correction.

FIG. 4A is a partial ray trace showing the optical path of one example of the imaging spectrometer 300. As shown, and as discussed above, the incident optical radiation 130 is received at the spectral optical module via an entrance slit which may be co-located with the image plane 322 and guided via the immersed reflective triplet 120 (including mirrors 122, 124, and 126 as shown in FIG. 1) to the dispersive element 140. The dispersed optical radiation 150 is reflected back through the reflective triplet 120 to the exit face 224 of the exit prism 220. The configuration and arrangement of the immersed reflective triplet 120, the entrance prism 210, and the exit prism 220 may provide a highly compact optical path and therefore an ultra-compact spectrometer package. For example, as shown in FIG. 4A, the optical path may have a dimension 302, which in certain examples may be as small as 5 centimeters (cm). The immersed reflective triplet 120 may have a volume that is 1/10th that of an equivalent Dyson spectrometer, and 1/500$^{th}$ the volume of an equivalent Offner-Chrisp spectrometer.

FIG. 4B is a diagram showing an example of a packaged spectral optical module 320 of an example of the spectrometer 300 and corresponding to the optical path shown in FIG. 4A. As discussed above, the monolithic spectrometer body component 100, including the immersed reflective triplet 120, may be packaged with the housing 330, along with the entrance prism 210 and the exit prism 220. The housing 330 includes a recess 338 to mount the slit (not shown) through which the incident optical radiation 130 is received. In certain examples the imaging detector array 324 may be located external to the housing 330, in which case the housing 330 may include an exit region 336 that is optically transparent to allow the dispersed optical radiation 150 to pass through. In other examples, as shown in FIG. 3, the imaging detector array 324 may be located within the housing 330. In this case, rather than being an optically transparent exit window region, the exit region 336 may be an electrical connector (e.g., if the detector includes an optical to electrical signal conversion component) or optical fiber connector, for example, to allow signals from the imaging detector array 324 to be conveyed to external electronics for processing and/or display.

Aspects and embodiments may provide an imaging spectrometer, which can be configured for thermal infrared imaging or imaging in other bands of the visible and/or infrared spectrum, that is highly compact and capable of excellent performance. FIGS. 5A, 5B, 6A, and 6B illustrate performance data for an example of the imaging spectrometer of FIGS. 4A and 4B. In this example, the imaging detector array 324 was an LWIR focal plane array module having a rectangular array of 1000 by 500 detector elements ("pixels") with 18 µm pitch (spacing between elements). The objective 310 was a three mirror anastigmat with 10 cm entrance pupil diameter, an optical speed of ~f/1.8, and the objective mirrors 312, 314, 316 made of aluminum. The cold pupil mask 334 had a 2 cm diameter, and the dimension 302 of the optical path shown in FIG. 4A was 5 cm.

Figure 5A:
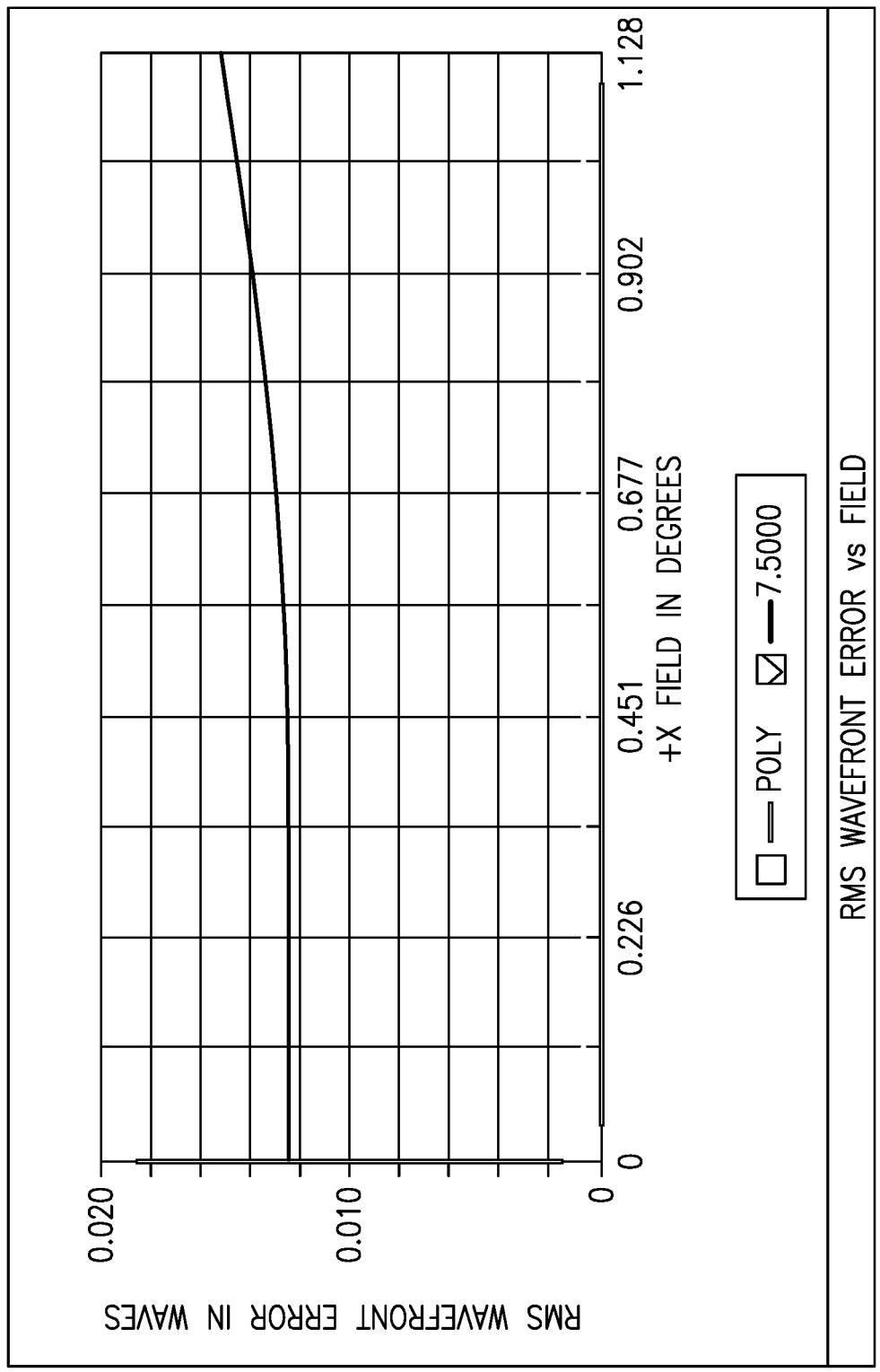
FIG. 5A is a graph of wavefront error as a function of field for an example of a three mirror anastigmat objective for an imaging spectrometer according to aspects of the present invention.
Figure 5B:
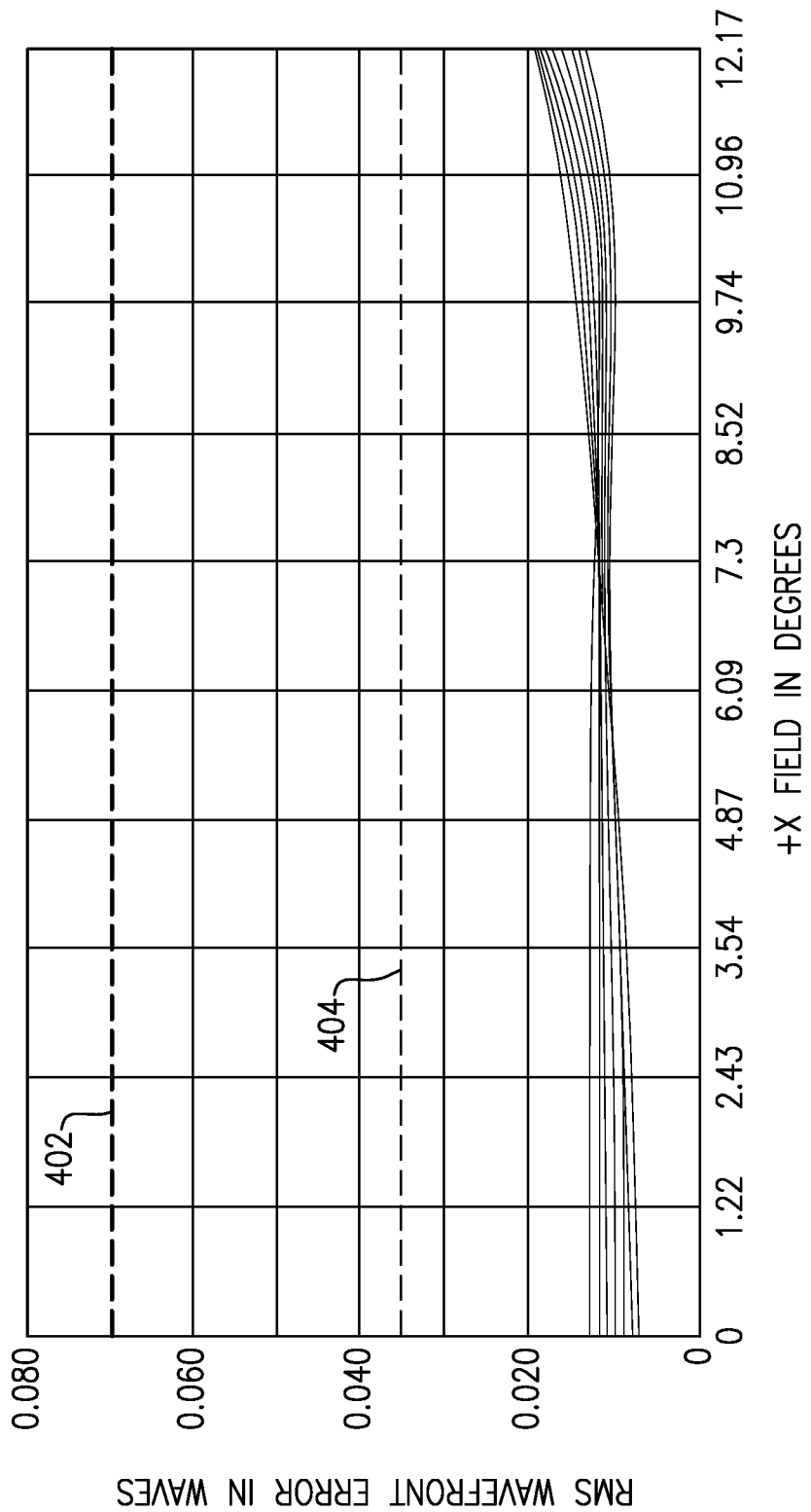
FIG. 5B is a graph of wavefront error as a function of field for an example of an imaging spectrometer according to aspects of the present invention.

FIG. 5A is a graph showing the residual wavefront error of the objective telescope. As shown, the residual wavefront error is less than 0.015 waves RMS at a wavelength of 7.5 µm of the incident optical radiation 130. FIG. 5B provides design residual wavefront error results for the example of the spectrometer for various wavelengths of the incident optical radiation 130. Dotted line 402 represents a threshold value, and dotted line 404 represents an objective or target value for the residual wavefront error. As shown, the design residual wavefront errors are well within these values. FIG. 6A shows design residual keystone performance for the example of the spectrometer 300. FIG. 6B shows design residual smile performance for the example of the spectrometer 300 over a fractional field of view of −1° to +1°.—In both FIGS. 6A and 6B, the dotted lines 406 represent threshold values, and the dotted lines 408 represent spectrometer specification target or objective values. As shown, the design residual performance results are well within both the target and threshold limits.

Thus, aspects and embodiments provide a highly compact imaging spectrometer that offers excellent performance. As discussed above, embodiments of the spectrometer include a monolithic spectrometer body component 100 with multiple optical surfaces forming a reflective triplet 120 with its optical path immersed inside the monolith/immersion material 110. A separate entrance prism 210 can be used for the initial portion of optical path to aid in stray light suppression and/or manufacturability. Similarly, a separate exit prism 220 may be used for the final portion of optical path to aid in stray light suppression and/or manufacturability. In certain examples the spectrometer slit may be formed by a coating/mask at the entrance face of the immersion material 110. The dispersive element 140 can be a diffraction grating that is formed integrally in the immersion material. In other examples, a grating or flat mirror can be placed external to the immersion material 110, optionally with an angled flat face providing prism dispersion as the light exits and enters before and after reflecting off the flat mirror or grating. The imaging detector array 324 may be tilted with respect to the exit face 224 of the exit prism 220 to provide chromatic correction.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. It is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. Accordingly, the foregoing description and drawings are by way of example only, and the scope of the invention should be determined from proper construction of the appended claims, and their equivalents.

What is claimed is:

1. A spectrometer module comprising:
a monolithic spectrometer body component made of an immersion material and including three mirrored surfaces configured to form a reflective triplet having an optical path immersed within the immersion material, the reflective triplet configured to receive incident optical radiation from an entrance face of the monolithic spectrometer body component and reflect the incident optical radiation along the optical path; and
a dispersive element configured to receive and disperse the incident optical radiation reflected from the reflective triplet to provide dispersed optical radiation;
wherein the reflective triplet is further configured to receive the dispersed optical radiation from the dispersive element and to reflect the dispersed optical radiation along the optical path to an exit face of the monolithic spectrometer body component, and wherein the optical path is immersed within the immersion material between the entrance face of the monolithic spectrometer body component and the dispersive element and between the dispersive element and the exit face of the monolithic spectrometer body component.

2. The spectrometer module of claim 1 wherein the immersion material is zinc selenide.

3. The spectrometer module of claim 1 wherein the dispersive element is a diffraction grating that includes a series of grooves cut into a surface of the monolithic spectrometer body component and a reflective coating disposed on the surface of the monolithic spectrometer body component over the series of grooves.

4. The spectrometer module of claim 1 further comprising an entrance prism configured to direct the incident optical radiation to the entrance face of the monolithic spectrometer body component.

5. The spectrometer module of claim 4 further comprising an exit prism configured to receive the dispersed optical radiation from the exit face of the monolithic spectrometer body component and focus the dispersed optical radiation onto an image plane.

6. The spectrometer module of claim 5 wherein the entrance prism and the exit prism are made of the immersion material.

7. The spectrometer module of claim 5 further comprising an imaging detector array located at the image plane and configured to receive and image the dispersed optical radiation.

8. The spectrometer module of claim 7 wherein the imaging detector array is tilted relative to the exit face of the monolithic spectrometer body component to provide chromatic correction.

9. The spectrometer module of claim 1 further comprising an entrance-exit prism configured to direct the incident optical radiation to the entrance face of the monolithic spectrometer body component and to receive the dispersed optical radiation from the exit face of the monolithic spectrometer body component and focus the dispersed optical radiation onto an image plane, the entrance-exit prism being made of the immersion material.

10. The spectrometer module of claim 1 further comprising an entrance slit formed as a coating on the entrance face of the monolithic spectrometer body component.

11. The spectrometer module of claim 1 further comprising a metal plate having an entrance slit disposed in a surface thereof and arranged to direct the incident optical radiation to the entrance face of the monolithic spectrometer body component.

12. An imaging spectrometer comprising:
an objective module configured to receive incident optical radiation from object space and to focus the incident optical radiation onto an image plane;
a spectral optical module configured to receive the incident optical radiation from the objective module via an entrance slit, the spectral optical module including a dispersive element configured to disperse the incident optical radiation to formed dispersed optical radiation, and a monolithic spectrometer body component, the monolithic spectrometer body component being made of an immersion material and including three mirrored surfaces configured to form a reflective triplet having an optical path immersed within the immersion material, the reflective triplet configured to receive the incident optical radiation from an entrance face of the monolithic spectrometer body component, to reflect the incident optical radiation along the optical path to the dispersive element, and to reflect the dispersed optical radiation along the optical path and focus the dispersed optical radiation through an exit face of the monolithic spectrometer body component onto a focal plane; and
an imaging detector array located at the focal plane.

13. The imaging spectrometer of claim 12 wherein the entrance slit is formed as a coating on the entrance face of the monolithic spectrometer body component.

14. The imaging spectrometer of claim 12 wherein the spectral optical module includes a metal plate, the entrance slit being formed in the metal plate.

15. The imaging spectrometer of claim 12 wherein the spectral optical module further includes:
an entrance prism located between the image plane and the entrance face of the monolithic spectrometer body component and configured to direct the incident optical radiation from the image plane to the reflective triplet via the entrance face of the monolithic spectrometer body component; and
an exit prism located between the exit face of the monolithic spectrometer body component and the focal plane and configured to direct the dispersed optical radiation from the exit face of the monolithic spectrometer body component to the focal plane.

16. The imaging spectrometer of claim 15 wherein the entrance prism and the exit prism are made of the immersion material.

17. The imaging spectrometer of claim 16 wherein the immersion material is zinc selenide.

18. The imaging spectrometer of claim 12 wherein the spectral optical module further includes an entrance-exit prism located proximate the monolithic spectrometer body component and configured to direct the incident optical radiation from the image plane to the reflective triplet via the entrance face of the monolithic spectrometer body component, and to direct the dispersed optical radiation from the exit face of the monolithic spectrometer body component to the focal plane.

19. The imaging spectrometer of claim 12 wherein the dispersive element is a diffraction grating that includes a series of grooves cut into a surface of the monolithic spectrometer body component and a reflective coating disposed on the surface of the monolithic spectrometer body component over the series of grooves.

20. The imaging spectrometer of claim 12 wherein the imaging detector array is tilted relative to the exit face of the monolithic spectrometer body component to provide chromatic correction.

21. The imaging spectrometer of claim 12 wherein the objective module includes an all-reflective three mirror anastigmat.

* * * * *